US005531538A

United States Patent [19]

Stolzer

[11] Patent Number: 5,531,538

[45] Date of Patent: Jul. 2, 1996

[54] PORTABLE ELECTRIC POWER TOOL HOUSING

[75] Inventor: J. Timothy Stolzer, Pickens, S.C.

[73] Assignee: Ryobi North America, Easley, S.C.

[21] Appl. No.: 322,221

[22] Filed: Oct. 13, 1994

[51] Int. Cl.$^6$ .......... B23B 45/02

[52] U.S. Cl. .......... 403/374; 403/360; 173/171

[58] Field of Search .......... 403/374, 373, 403/360, 409.1; 173/217, 171, 170

[56] References Cited

U.S. PATENT DOCUMENTS

D. 184,624 3/1959 Kirkbride .
D. 208,212 8/1967 Averitt .
D. 259,392 6/1981 Elmessaar et al. .
D. 280,796 10/1985 Somers .
D. 280,883 10/1985 Sakamoto et al. .
D. 300,717 4/1989 Hasegawa et al. .
D. 300,718 4/1989 Fushiya et al. .
D. 303,347 9/1989 Somers .
D. 304,287 10/1989 Zurwelle .
D. 314,498 2/1991 Hoshino et al. .
D. 314,698 2/1991 Zurwelle .
D. 319,763 9/1991 Rieferscheid .
D. 326,400 5/1992 Fushiya et al. .
D. 330,152 10/1992 Ogawa et al. .
2,970,483 2/1961 Schrum, Sr. .
3,077,547 2/1963 Metko .......... 173/170 X
3,651,707 3/1972 Rees .
3,908,139 9/1975 Duncan, Jr. .
4,073,348 2/1978 Schramm et al. .
4,159,050 6/1979 Hopkins, Sr. et al. .
4,493,223 1/1985 Kishi et al. .
4,730,134 3/1988 Sistare .
5,019,023 5/1991 Kurosawa .
5,036,926 8/1991 Cavedo .

*Primary Examiner*—Anthony Knight
*Attorney, Agent, or Firm*—Brooks & Kushman

[57] ABSTRACT

A housing apparatus for an electric power tool which has a nose cone, a clam shell housing, and a bearing plate. The nose cone contains a bevel portion, a bearing plate retaining portion, and at least one hole oriented generally transverse to a tool axis for reception of at least one fastener. The clam shell housing has a first and a second housing segment, each having a matching bevel portion for cooperation with the bevel portion of the nose cone. The first and the second housing segments each further have a bearing plate retaining portion and at least hole aligned with the at least hole of the nose cone for simultaneous reception of the at least one fastener. The bearing plate has at least one threaded hole oriented generally transverse to the tool axis for receiving the at least one fastener. The bearing plate is located between the retaining portion of the nose cone and the retaining portion of the clam shell housing. The matching bevel portion cooperates with the bevel portion to convert a generally transverse force resulting from the engaging reception of the at least one fastener to an axial force which acts to axially retain the bearing plate between the retaining portion of the nose cone and the retaining portion of the clam shell housing, and acts to secure the nose cone to the clam shell housing.

13 Claims, 1 Drawing Sheet

PORTABLE ELECTRIC POWER TOOL HOUSING

TECHNICAL FIELD

The present invention relates generally to housings for power hand tools, and more particularly, to an apparatus for securing a nose cone to a housing of an electric power drill.

BACKGROUND ART

The use of power hand tools, such as an electric power drill, have become commonplace in various household applications. Electric power drills are employed for such tooling operations as drilling holes and driving fasteners. Many of these, and other, applications of power tools dictate that the tool operation be performed in a physically-constrained region, such as an acutely-angled corner or a narrow recess. Consequently, the use of a power tool becomes limited if any external dimension thereof prohibits the tool to be properly positioned in the physically constrained region.

Many electric power drills comprise a housing which encloses a drill motor and a nose cone which contains a gear case for transferring rotational power from a shaft of the motor to a bit mounted in the drill. The assembling of the power drill includes a step of fastening the nose cone to the housing. Various assemblies having been proposed for fastening the nose cone to the housing. In early electric drill designs, the nose cone was threadably fastened to the housing. These designs resulted in either a weakly-fastened nose cone or an expensively-manufactured drill.

U.S. Pat. No. 3,908,139 to Duncan, Jr. discloses a portable power tool having a nose cone joined to first and second clam shell housing segments by an annular fastener receiving member seated in a groove in the housing. The nose cone is joined to the housing by fasteners which pass axially through the nose cone for reception by the fastener receiving member. U.S. Pat. No. 4,730,134 to Sistare discloses a portable power tool having a nose cone joined to first and second clam shell housing segments by a bearing plate fastened to walls of the housing. The nose cone is then clamped to the housing segments by screws which pass axially through the nose cone for reception by the bearing plate.

Since the size of the housing and the nose cone contributes to the external dimensions of the tool, the scope of application of the tool must be regarded when designing an assembly for fastening the nose cone to the housing. In both of the above-mentioned arrangements, at least one transverse dimension of the nose cone extends to sufficiently accommodate the head of each of the fastening screws. Such arrangements are disadvantageous in applications where a tool operation must be performed in regions having limited space available for transverse dimensions of the nose cone.

SUMMARY OF THE INVENTION

For the foregoing reasons, the need exists for an electric power drill housing having a front end with a reduced transverse dimension.

It is thus an object of the present invention to provide an apparatus for fastening the nose cone to the housing of an electric power drill which reduces a transverse dimension of the front end.

A further object of the present invention is provide a housing apparatus which reliably positions and secures both the bearing plate and the nose cone with respect to the housing of a power drill.

In carrying out the above objects, the present invention provides a housing apparatus in a power tool. A nose cone having a front end, a rear end, and a tool axis, includes a bevel portion at the rear end and at least one hole for reception of at least one fastener oriented generally transverse to the tool axis. A clam shell housing comprising a first and a second housing segment has a matching bevel portion for cooperation with the bevel portion of the nose cone. The clam shell housing further has at least one hole aligned with the at least one hole of the nose cone for simultaneous reception of the at least one fastener. A fastener receiving member includes at least one threaded hole oriented generally transverse to the tool axis for engagingly receiving the at least one fastener. The matching bevel portion cooperates with the bevel portion to convert a generally transverse force resulting from the engaging reception of the at least one fastener to an axial force which acts to secure the nose cone to the clam shell housing.

In further carrying out the above objects, the present invention provides a housing apparatus for an electric power drill. A nose cone having a front end, a rear end, and a tool axis, contains a bevel portion, a bearing plate retaining portion, and at least one hole located at the rear end. The at least one hole is oriented generally transverse to the tool axis for reception of at least one fastener. A clam shell housing comprises a first and a second housing segment, each containing a matching bevel portion for cooperation with the bevel portion of the nose cone. The first and the second housing segments each further include a bearing plate retaining portion. The clam shell housing has at least one hole aligned with the at least one hole of the nose cone for simultaneous reception of the at least one fastener. A bearing plate having at least one threaded hole oriented generally transverse to the tool axis for receiving the at least one fastener is located between the retaining portion of the nose cone and the retaining portion of the clam shell housing. The matching bevel portion cooperates the bevel portion to convert a generally transverse force resulting from the engaging reception of the at least one fastener to an axial force which acts simultaneously to secure the nose cone to the clam shell housing and to axially retain the bearing plate between the retaining portion of the nose cone and the retaining portion of the clam shell housing.

These and other features, aspects, and embodiments of the present invention will become better understood with regard to the following description, appended claims, and accompanying drawings.

BEST MODE FOR CARRYING OUT THE INVENTION

Embodiments of the present invention overcome the disadvantages of prior assemblies for fastening a nose cone to a housing of a power tool by employing fasteners which are inserted generally transverse to the axis of the tool.

Hence, transverse dimensions of the nose cone need not extend to accommodate the diameter of the heads of each of the fasteners. The assembly further includes means for converting a transverse force resulting from an engaging reception of the fasteners to an axial force which acts to secure the nose cone to the housing.

Figure 1:
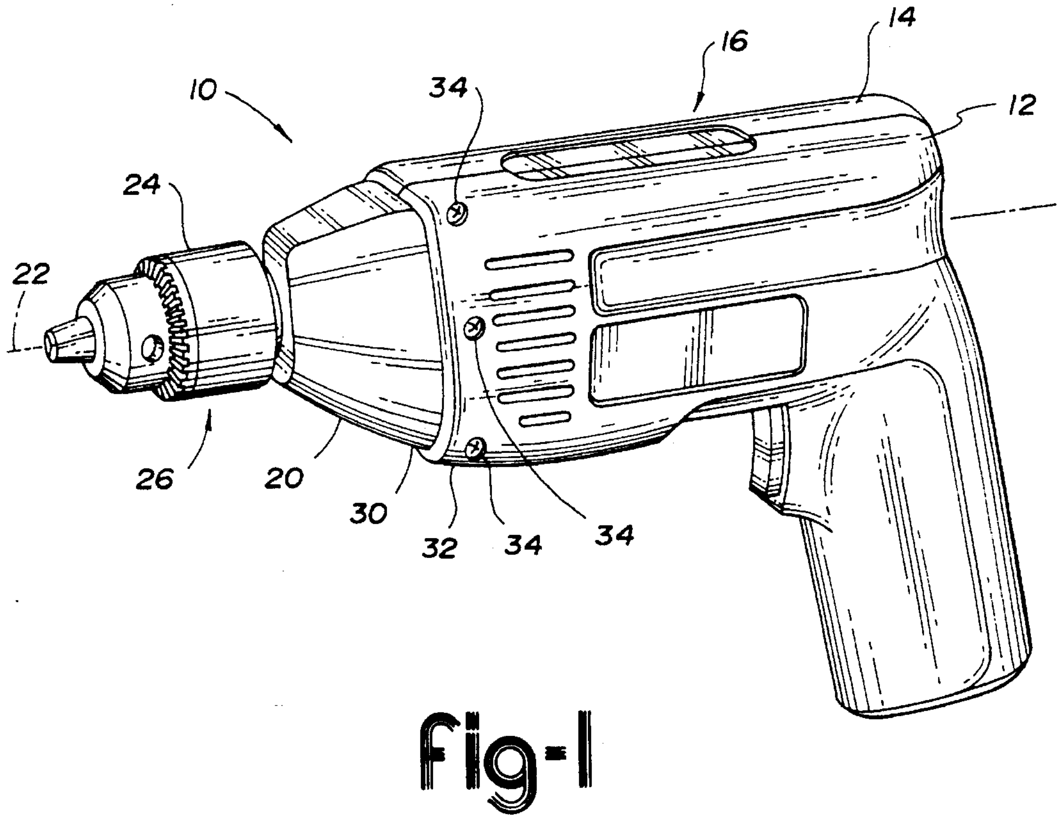
FIG. 1 is a perspective view of a power tool in accordance with an embodiment of the present invention.

A perspective view of an embodiment of a power tool 10 in accordance with the present invention is illustrated in FIG. 1. A first housing segment 12 and a second housing segment 14 are fastened to form a housing 16. The housing 16 encloses internal mechanisms and related electrical devices, such as a drill motor (not shown) and an internal battery pack (not shown), which interact to provide the operation of the power tool 10. The first and second housing segments 12 and 14 of FIG. 1 are symmetrically similar segments which enclose opposite sides of the power tool 10. Such an arrangement is often referred to a clam shell housing.

A nose cone 20 is located in front of the housing 16 along an axis 22 of the power tool 10. For an electric power drill embodiment of the power tool 10, the nose cone 20 may comprise a gear case for transferring rotational power from a shaft of the motor to a bit mounted in a chuck 24 at a front end 26 of the nose cone 20. A rear end 30 of the nose cone 20 is secured to a front end 32 of the housing 16 by fasteners 34. The fasteners 34 are inserted generally transverse to the axis 22 into both the housing 16 and the nose cone 20. For the clam shell housing segments 12 and 14, each of the segments can include an equal number of transverse fasteners for securing the nose cone 20 to the housing 16, although embodiments of the present invention are not limited thereto.

Figure 2:
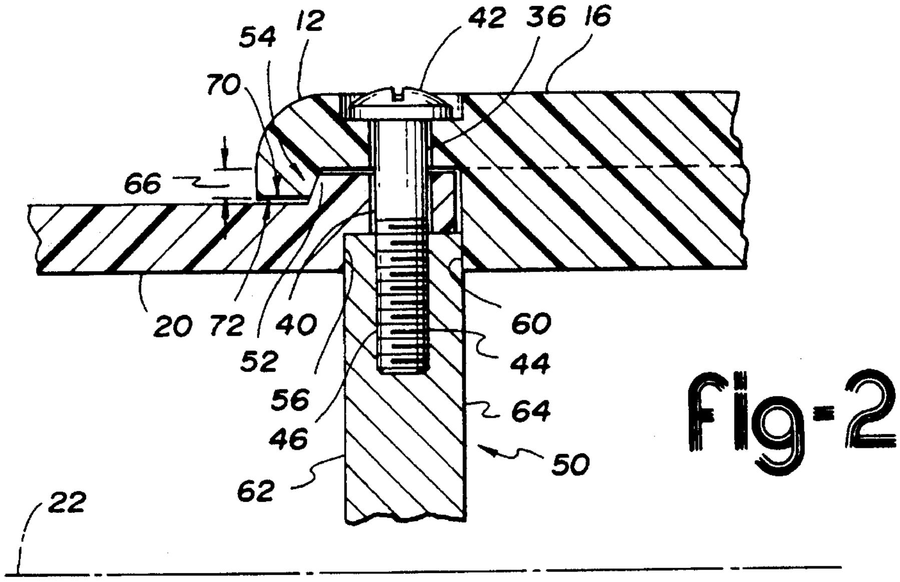
FIG. 2 is a fragmentary, cross-sectional view illustrating the fastening of the nose cone to the housing in accordance with the present invention.

A cross-sectional view illustrating the fastening of the nose cone 20 to the housing 16 by an illustrated fastener 42 of the fasteners 34 is shown in FIG. 2. The housing 16 includes a hole 36 aligned with a hole 40 of the nose cone 20 to allow simultaneous reception of the illustrated fastener 42. The illustrated fastener 42 includes threadings 44 for engaging reception by a threaded hole 46 in a fastener receiving member 50. The threaded hole 46 is located on a surface of the fastener receiving member 50 which is radially peripheral with respect to the axis 22 to allow reception of the generally transversely-oriented fastener 42. In a preferred embodiment, neither the hole 36 nor the hole 40 are threaded for engagement with the threadings 44 of the illustrated fastener 42. Hence, engaging reception of the fastener 42 by the receiving member 50 acts to provide opposing forces, transverse to the axis 22, to the nose cone 20 and the housing 16.

The nose cone 20 further includes a bevel portion 52 at the rear end for cooperation with a matching bevel portion 54 at the front end of the housing 16. The bevel portion 52 of the nose cone 20 extends radially outward with respect to the axis 22, while the matching bevel portion of the housing 16 extends radially inward. The combination of the bevel portion 52 and the matching bevel portion 54 provides means for converting the opposing transverse forces provided by the engaging reception of the fastener 42 by the fastener receiving member 50 to opposing axial forces at an interface between the nose cone 20 and the housing 16. The opposing axial forces act to secure the nose cone 20 to the housing 16.

For the electric power drill embodiment, the fastener receiving member comprises a bearing plate. The bearing plate is used for journal and bearing support of the shaft of the motor provided to the gear mechanism within the nose cone 20. In order to stabilize and secure the positioning of the bearing plate with respect to the housing 16, the nose cone 20 and the housing 16 each include a corresponding bearing plate retaining portion, indicated by reference numerals 56 and 60, respectively. The bearing plate retaining portions 56 and 60 each comprise a planar surface generally normal to the tool axis 22 for contacting opposite faces 62 and 64 of the bearing plate. The opposing axial forces produced by the combination of the bevel portion 52 and the matching bevel portion 54 upon engaging reception of the fastener 42 act to secure the bearing plate between the retaining portion 56 of the nose cone 20 and the retaining portion 60 of the housing 16. In the embodiment of FIG. 2, the bevel portion 52 and the matching bevel portion 54 are of suitable width, indicated by reference numeral 66, such that when the retaining portions contact the faces of the bearing plate, no transverse contact is made between the nose cone 20 and the housing 16 at interfaces 70 and 72.

Although illustrated in terms of an electric power drill, with having ordinary skill in the art will recognize that embodiments of the present invention can be employed for securing a nose cone to a housing for various types of power tools.

The previously described embodiments of the present invention have many advantages. One such advantage is the reduction of the cross-sectional dimension of the nose cone which results from the replacement of longitudinally-inserted fasteners with transversely-inserted fasteners. The reduction of the transverse dimension of the nose cone expands the scope of application of the resulting power tool. Another advantage is a reliable positioning and securing of the bearing plate and the nose cone with respect to the housing of the power drill which results from having both longitudinal joining forces due to the fasteners and axial joining forces due to the matching bevel portions and the bearing plate retaining portions.

While the best mode for carrying out the invention has been described in detail, those familiar with the art to which this invention relates will recognize various alternative designs and embodiments for practicing the invention as defined by the following claims.

What is claimed is:

1. In a power tool, an apparatus comprising:

a nose cone having a front end and a rear end oriented along a tool axis, the nose cone containing at the rear end a bevel portion and at least one hole for reception of at least one fastener oriented generally transverse to the tool axis;

a clam shell housing comprising a first and second housing segment, the clam shell housing having a matching bevel portion for cooperation with the bevel portion of the nose cone, the clam shell housing further having at least one hole aligned with the at least one hole of the nose cone for simultaneous reception of the at least one fastener; and a bearing plate having at least one threaded hole oriented generally transverse to the tool axis for engagingly receiving the at least one fastener;

wherein the matching bevel portion of the clam shell housing cooperates with the bevel portion of the nose cone to convert a generally transverse force resulting from the engaging reception of the at least one fastener to an axial force which acts to secure the nose cone to the clam shell housing.

2. The apparatus of claim 1 wherein the power tool is an electric power drill.

3. The apparatus of claim 1 wherein the matching bevel portion of the clam shell housing is located adjacent to the bevel portion of the nose cone.

4. The apparatus of claim 1 wherein the bevel portion of the nose cone extends radially outward.

5. The apparatus of claim 1 wherein the matching bevel portion of the clam shell housing extends radially inward.

6. The apparatus of claim 1 wherein the first housing segment and the second housing segment each include a corresponding bevel portion for cooperation with the bevel portion of the nose cone.

7. The apparatus of claim 1 wherein the nose cone and the clam shell housing each include a corresponding bearing plate retaining portion which axially retains the bearing plate between the nose cone and the clam shell housing upon engaging reception of the at least one fastener.

8. A housing apparatus for an electric power drill, the housing apparatus comprising:

a nose cone having a front end and a rear end oriented along a tool axis, the nose cone containing at the rear end a bevel portion, a bearing plate retaining portion, and at least one hole oriented generally transverse to the tool axis for reception of at least one fastener;

a clam shell housing comprising a first and a second housing segment each having a matching bevel portion for cooperation with the bevel portion of the nose cone, the first and the second housing segments further having a bearing plate retaining portion, the clam shell housing having at least one hole aligned with the at least one hole of the nose cone for simultaneous reception of the at least one fastener; and a bearing plate having at least one threaded hole oriented generally transverse to the tool axis for receiving the at least one fastener;

wherein the matching bevel portion of the clam shell housing cooperates with the bevel portion of the nose cone to convert a generally transverse force resulting from the engaging reception of the at least one fastener to an axial force which acts simultaneously to secure the nose cone to the clam shell housing and to axially retain the bearing plate between the retaining portion of the nose cone and the retaining portion of the clam shell housing.

9. A portable electric drill comprising:

a motor assembly including a drive motor, a bearing plate, and a rotary output shaft cooperating with the bearing plate, the bearing plate having at least one threaded hole oriented generally transverse to the output shaft for engagingly receiving at least one fastener;

a chuck affixed to the free end of the output shaft removably receiving a tool bit; and a housing assembly generally enclosing the motor assembly, the housing assembly formed by;

a unitary nose cone having a front end and a rear end oriented along an axis of the output shaft, the front end defining an aperture sized to allow the output shaft free end to project therefrom, a nose cone containing at the rear end thereof a bevel portion, a bearing plate retaining portion, and at least one hole for reception of the at least one fastener oriented generally transverse to the tool axis; and a clam shell housing comprising a first and second housing segment, the clam shell housing having a matching bevel portion for cooperation with the bevel portion of the nose cone, the clam shell housing further having at least one hole aligned with the at least one hole of the nose cone for simultaneous reception of the at least one fastener;

wherein the matching bevel portion of the clam shell housing cooperates with the bevel portion of the nose cone to convert a generally transverse force resulting from the engaging reception of the at least one fastener with the bearing plate to an axial force which acts to secure the nose cone to the clam shell housing.

10. The apparatus of claim 9 wherein the bevel portion of the nose cone extends radially outward.

11. The apparatus of claim 9 wherein the matching bevel portion of the clam shell housing extends radially inward.

12. The apparatus of claim 9 wherein the first housing segment and the second housing segment each include a corresponding bevel portion for cooperation with the bevel portion of the nose cone.

13. The apparatus of claim 9 wherein the nose cone and the clam shell housing each include a corresponding bearing plate retaining portion which axially retains the bearing plate between the nose cone and the clam shell housing upon engaging reception of the at least one fastener.

* * * * *